United States Patent
Ishizaka et al.

(10) Patent No.: US 7,128,194 B2
(45) Date of Patent: Oct. 31, 2006

(54) CENTRIFUGAL CLUTCH

(75) Inventors: Takashi Ishizaka, Saitama (JP);
Masaaki Narita, Saitama (JP); Akira Shigahara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 225 days.

(21) Appl. No.: 10/609,413

(22) Filed: Jul. 1, 2003

(65) Prior Publication Data
US 2004/0055851 A1 Mar. 25, 2004

(30) Foreign Application Priority Data
Jul. 5, 2002 (JP) .............. 2002-196782

(51) Int. Cl.
*F16D 43/18* (2006.01)

(52) U.S. Cl. .................. 192/105 CD; 192/107 M; 192/107 T (58) Field of Classification Search ......... 192/105 CD, 192/107 M, 107 T, 105 BA
See application file for complete search history.

(56) References Cited

U.S. PATENT DOCUMENTS

| | | | |
|---|---|---|---|
| 2,171,833 A * | 9/1939 | Lewis | 192/105 C |
| 3,727,478 A * | 4/1973 | Erickson et al. | 192/105 C |
| 4,016,964 A * | 4/1977 | Dietzsch et al. | 192/105 CD |
| 4,226,320 A * | 10/1980 | St. John | 192/105 CD |
| 4,294,342 A * | 10/1981 | St. John | 192/105 CD |
| 4,450,942 A * | 5/1984 | Takefuta et al. | 192/48.9 |
| 5,562,555 A * | 10/1996 | Peterson | 192/105 CD |
| 5,577,587 A * | 11/1996 | Jansson | 192/105 CD |
| 5,795,255 A * | 8/1998 | Hooper | 474/14 |

FOREIGN PATENT DOCUMENTS

| | | | |
|---|---|---|---|
| DE | 27 17 611 A1 | * | 10/1978 |
| GB | 856525 | | 12/1960 |
| GB | 1368130 A | | 9/1974 |
| JP | 63-23034 A | * | 1/1988 |
| JP | 63-27586 B2 | | 6/1988 |
| JP | 2003-287061 A | * | 10/2003 |
| SU | 301476 A | | 4/1971 |
| SU | 1008532 A | | 3/1983 |

* cited by examiner

*Primary Examiner*—Rodney H. Bonck
(74) *Attorney, Agent, or Firm*—Birch, Stewart, Kolasch & Birch, LLP (57) ABSTRACT

A centrifugal clutch for a vehicle for reducing the trouble occuring when the clutch capacity becomes insufficient due a modification to the vehicle, such that of increasing the engine output or the exhaust gas quantity. The clutch weight of the centrifugal clutch is assembled by stacking a set of five sheets of clutch weight component members, three of which have similar structures. Each clutch weight component member is composed of two formed portions, the portions formed by baking two kinds of sintered metallic powders differing in specific gravity. Portions away from a fulcrum of inclination are formed by baking the sintered metallic powder having a larger specific gravity. Portions near the fulcrum of inclination are formed by baking the sintered metallic powder having a smaller specific gravity. As a result, the center of gravity of the clutch weight is positioned near a tip portion of the weight.

17 Claims, 7 Drawing Sheets

BACKGROUND ART

FIG. 9

BACKGROUND ART

CENTRIFUGAL CLUTCH

CROSS-REFERENCE TO RELATED APPLICATIONS

The present application claims priority under 35 USC 119 to Japanese Patent Application No. 2002-196782 filed on Jul. 5, 2002, the entire contents thereof is hereby incorporated by reference.

BACKGROUND OF THE INVENTION

1. Field of the Invention

The present invention relates to a centrifugal clutch, more particularly to a starting clutch for a vehicle, and to an improvement of the clutch for eliminating the trouble arising from a deficiency in capacity of the clutch which is generated due to a modification to the vehicle, such an increase in engine output or an increase in exhaust gas quantity.

2. Description of Background Art

A centrifugal clutch for starting of a vehicle is connected directly to a crankshaft of an engine, and has a structure in which attendant on the rotation of the crankshaft, a plurality of clutch weights of the centrifugal clutch are inclined outwards against a spring force by the action of centrifugal forces, and a lining portion at an outer circumferential portion of the clutch weights is brought into contact with and engaged with an inner circumferential portion of a clutch outer, whereby the power of the crankshaft is transmitted from the clutch outer through a driving gear, a driven gear and a speed change clutch to a main shaft of a transmission mechanism. Such a centrifugal clutch is conventionally well known, as one example thereof is described in Japanese Patent Publication No. Sho 63-27586.

Figure 8:
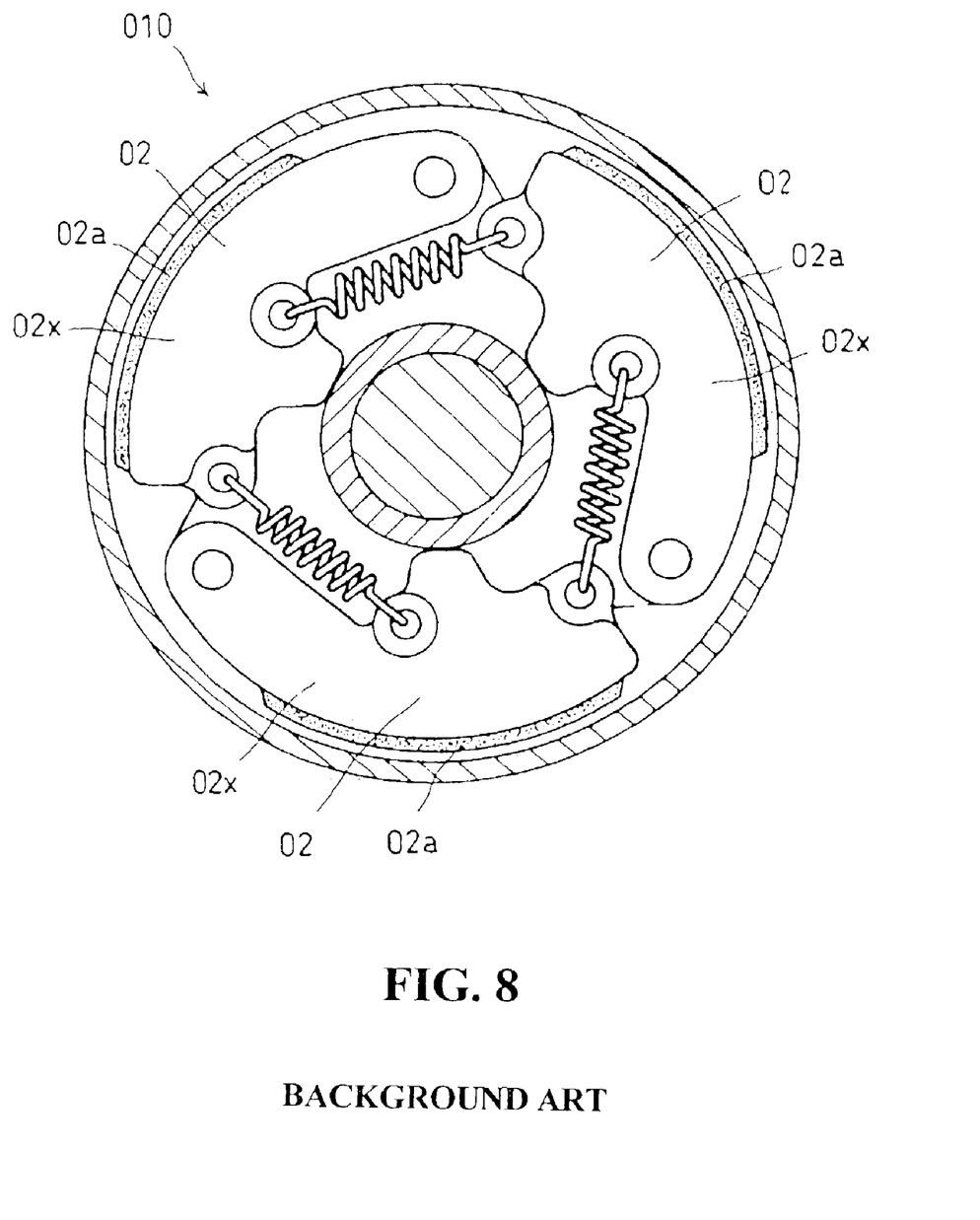
FIG. 8 shows an essential structural part of a conventional centrifugal clutch.
Figure 9:
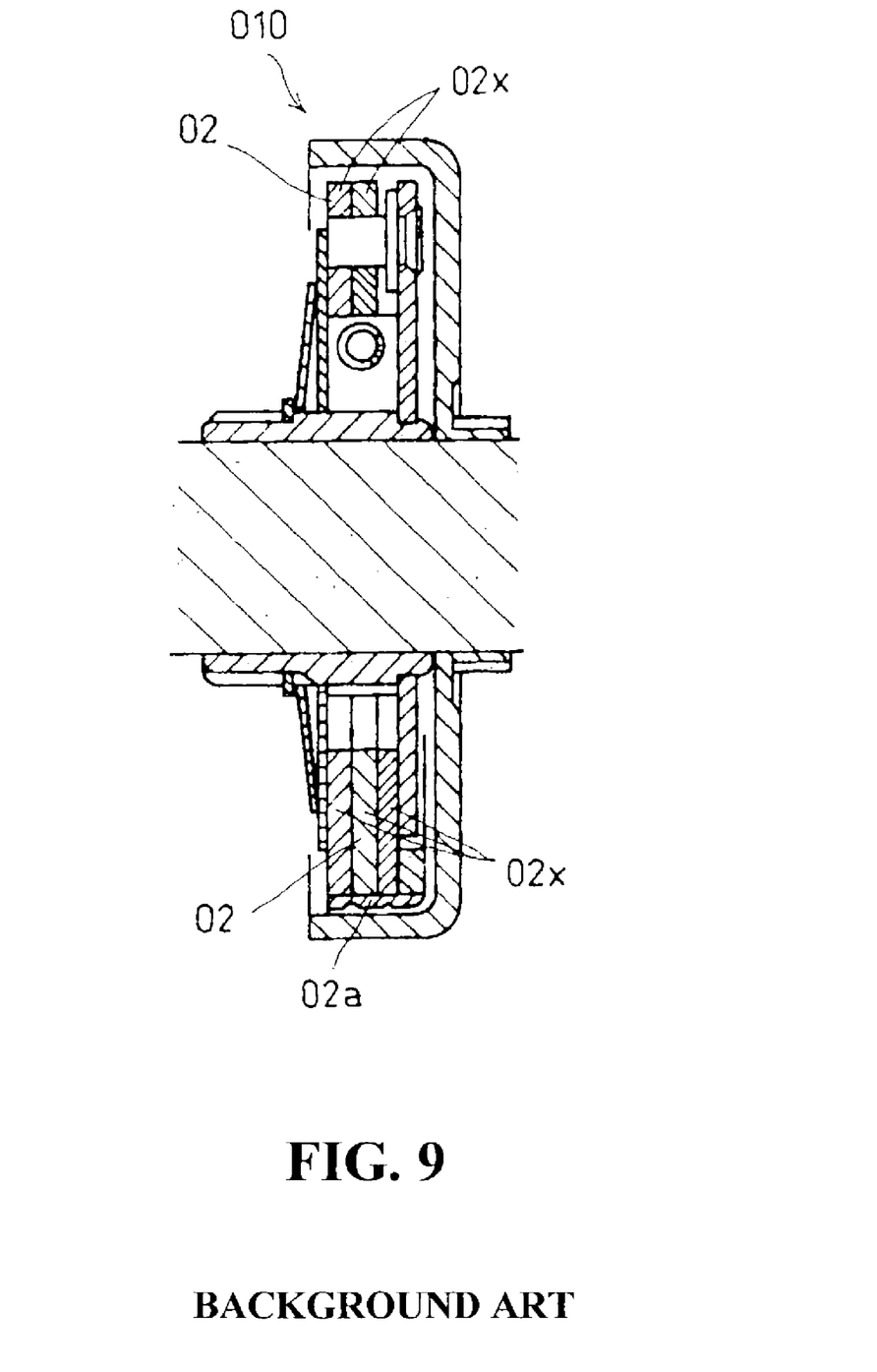
FIG. 9 is a sectional view of the conventional centrifugal clutch.

As shown in FIGS. 8 and 9, each clutch weight 02 of the centrifugal clutch 010 has a structure in which a plurality of sheets of weight component members 02X formed in a predetermined shape by baking an appropriate sintered metallic powder are united by stacking them and fixing them together by an appropriate means, and a lining member (portion) 02a is adhered to an outer circumferential portion of the united body. Alternatively, each clutch member 02 has a structure in which a plurality of sheets of weight component members 02X formed by stamping an appropriate steel sheet such as an SP material (e.g., a hard metal) in a predetermined shape are united by stacking them and fixing them together by an appropriate means such as welding, and a lining (portion) member 02a is adhered to an outer circumferential portion of the united body. In any case, the weight component member 02X is composed of a single member.

Meanwhile, when a modification for an increase in engine output or an increase in engine exhaust gas quantity in a vehicle is contrived, it is supposed that the centrifugal clutch for the starting that has been used hitherto is used as it is. In this case, attendant on the modification for an increase in the engine output or an increase in the exhaust gas quantity, the capacity of the centrifugal clutch becomes deficient, and the matching property thereof is lost, resulting in that a stagger is generated in the engaging timing (stall) of the clutch or the like due to the deficiency in the capacity.

For example, when the power of an engine with a higher output is transmitted by a centrifugal clutch with the same capacity, the centrifugal force generated in the weight is the same at a minimum engine rotation frequency at which the power has been perfectly transmitted where the centrifugal clutch has been used for an engine with a lower output, but, under the higher engine output, the centrifugal clutch is not perfectly engaged and a slip is generated therein. Therefore, for perfect engagement of the clutch, the engine rotational frequency must be increased, resulting in that it takes a longer time until the clutch connection is made, the efficiency of the process from starting to normal running is lowered, and fuel consumption becomes worse.

Since the stagger in the engaging timing of the clutch is attributable to the structure and function of the centrifugal clutch themselves, the above-mentioned problems cannot be dissolved without a structural modification such as an increase of the clutch capacity.

Accordingly, a structural modification for increase the capacity of the centrifugal clutch attendant on the modification for an increase in engine output or in engine exhaust gas quantity, i.e., a structural modification consisting in an increase of clutch capacity for matching the engaging timing of the centrifugal clutch attendant on the modification of engine performance, is indispensable.

As a structural modification for an increase in the capacity of the centrifugal clutch according to the background art, a structural modification consisting in a change in the outer shape of the clutch weight itself such as an increase of the width of a tip portion of the clutch weight or a change of the thickness thereof has been principally adopted.

The structural modification can be said to be a natural choice, in view of the fact that the base material of the conventional clutch weight is a single material such as an SP material or is formed by baking a single sintered metallic powder.

However, the structural modification consisting in a change of the outer shape of the clutch weight member for the modification of the capacity of the centrifugal clutch leads to an increase in the size of the centrifugal clutch, which is not an appropriate selection in view of the arrangement of the clutch in a limited space. Namely, adoption of the structural modification consisting in modifying the outer shape of the weight member is not an appropriate selection, since it leads to a change in the surrounding structure for securing a space necessary for coping with the increase in the clutch size and the change of the surrounding structure is expensive.

Accordingly, there is a demand for an appropriate measure of increasing the clutch capacity for solving the problems such as a stagger in the engaging timing of the centrifugal clutch generated attendant on an increase in engine output or in engine exhaust gas quantity, without increasing the size of the centrifugal clutch.

SUMMARY AND OBJECTS OF THE INVENTION

The present invention relates to an improvement of the centrifugal clutch for solving the above-mentioned problems, and particularly to an improvement of the clutch weight. The present invention resides in a centrifugal clutch for transmitting power by connecting the driving side and the driven side to each other through inclination of a clutch weight under a centrifugal force, wherein the clutch weight includes a means for setting the center of gravity to a desired position without changing the outer shape thereof.

According to a first aspect of the invention, the clutch weight includes a means for setting the center of gravity to a desired position without changing the outer shape thereof, so that a centrifugal clutch having a capacity suited to a modification in engine output or engine exhaust gas quantity can be obtained without need to increase the size of the clutch.

According to a second aspect of the invention, the means for setting the center of gravity of the clutch weight to a desired position without changing the outer shape of thereof has a structure in which the clutch weight is composed of a formed portion formed by baking a sintered metallic powder with a smaller specific gravity and a formed portion formed by baking a sintered metallic powder with a larger specific gravity, and the formed portion formed by baking the sintered metallic powder with the larger specific gravity is set on the side of a tip portion of the clutch weight away from a fulcrum for the inclination of the clutch weight. Therefore, the capacity of the centrifugal clutch can be increased, and the centrifugal clutch having a capacity suited to an increase in engine output or engine exhaust gas quantity can be obtained without need to increase the size of the clutch and by a simple structural modification of the clutch weight.

According to a third aspect of the invention, the means for setting the center of gravity of the clutch weight to a desired position without changing the outer shape thereof has a structure in which a member formed of a material having a specific gravity larger than the specific gravity of a base material of the clutch weight is selectively charged or fitted in a hole provided on the side of a tip portion of the clutch weight away from a fulcrum for the inclination of the clutch weight. Therefore, the capacity of the centrifugal clutch can be increased, and a centrifugal clutch having a capacity adapted to an increase in engine output or engine exhaust gas quantity can be obtained without need to increase the size of the clutch and by a simple structural modification of the clutch weight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Next, an embodiment of the present invention will be described below based on FIGS. 1 to 7.

Figure 1:
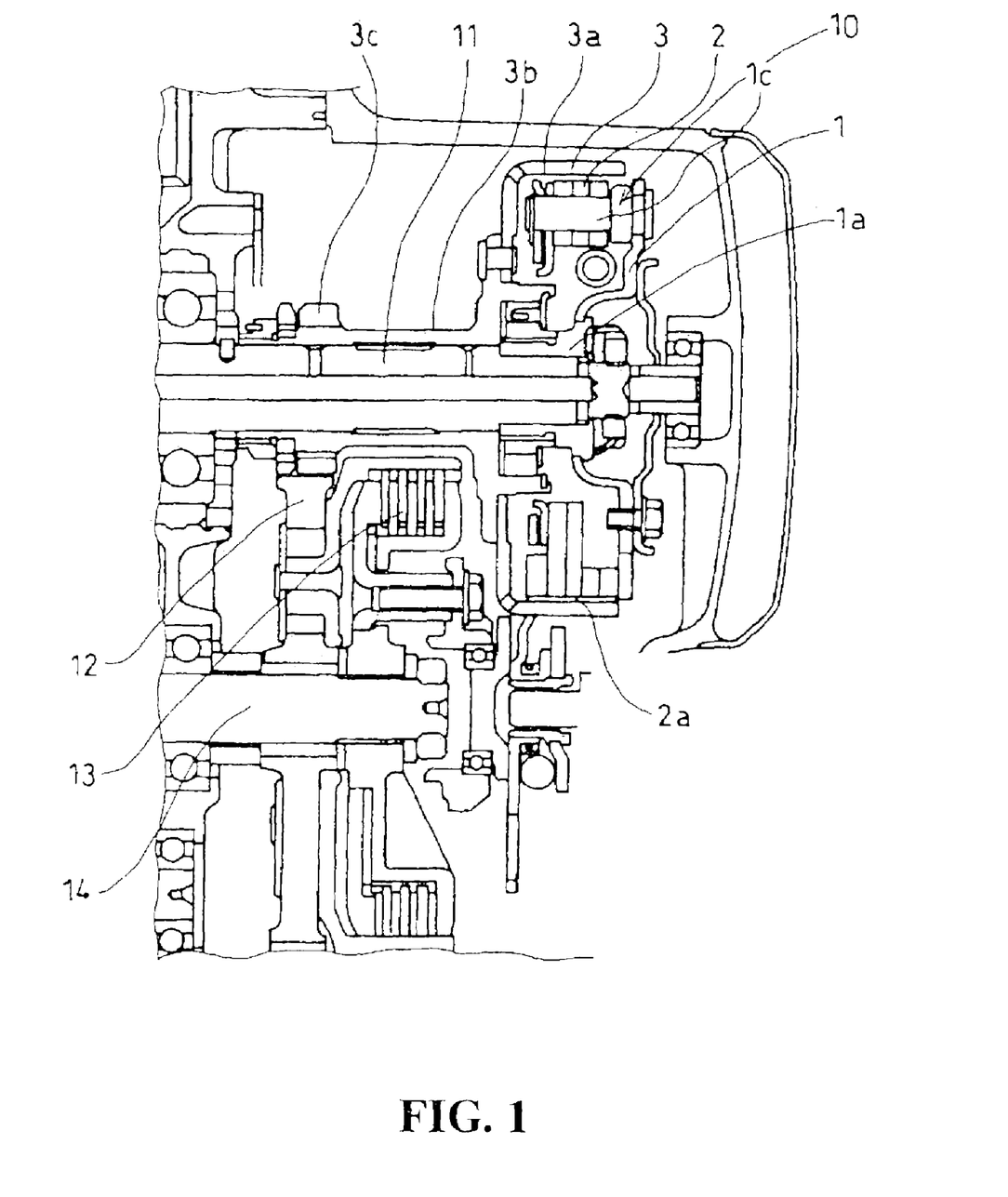
FIG. 1 shows the outline of a mode of using a centrifugal clutch according to the present invention and the surrounding structure thereof.

A centrifugal clutch 10 according to the present invention, as shown in FIG. 1, is used as a starting clutch 10 for a vehicle and has a structure in which the clutch 10 is attached directly to an end portion of an engine crankshaft 11, a plurality of clutch weights 2 are capable of free inclination with a pin portion 1c as a fulcrum of inclination, an annular clutch outer 3 is provided on the outside of an outer circumferential portion of the clutch weights 2 so as to cover the outer circumferential portion, the clutch outer 3 is connected to a hollow shaft member 3b, and a driving gear 3c provided on the hollow shaft member 3b is meshed with a driven gear 12 freely mounted on a main shaft 14 of a transmission mechanism.

Therefore, when the rotation of the crankshaft 11 reaches a predetermined rotation, each weight 2 of the centrifugal clutch 10 is inclined with the fulcrum of inclination as a center under a centrifugal force thereof, and the lining portion 2a at the outer circumferential portion thereof is brought into contact with and engaged with an inner circumferential portion 3a of the clutch outer 3. As a result, the rotation of the crankshaft 11 is transmitted from the clutch outer 3 to the driving gear 3c on the hollow shaft member 3b, the rotation of the driving gear 3c is transmitted to the driven gear 12 through the meshing therebetween, and the rotation is transmitted from the driven gear 12 through a speed change clutch 13 to the main shaft 14 of the transmission mechanism.

The operation of the centrifugal clutch 10 and the structure of the power transmission portion related to the operation have been well known.

The structure of the centrifugal clutch 10 according to the present invention that is used in the above-mentioned mode will be described in detail.

Figure 2:
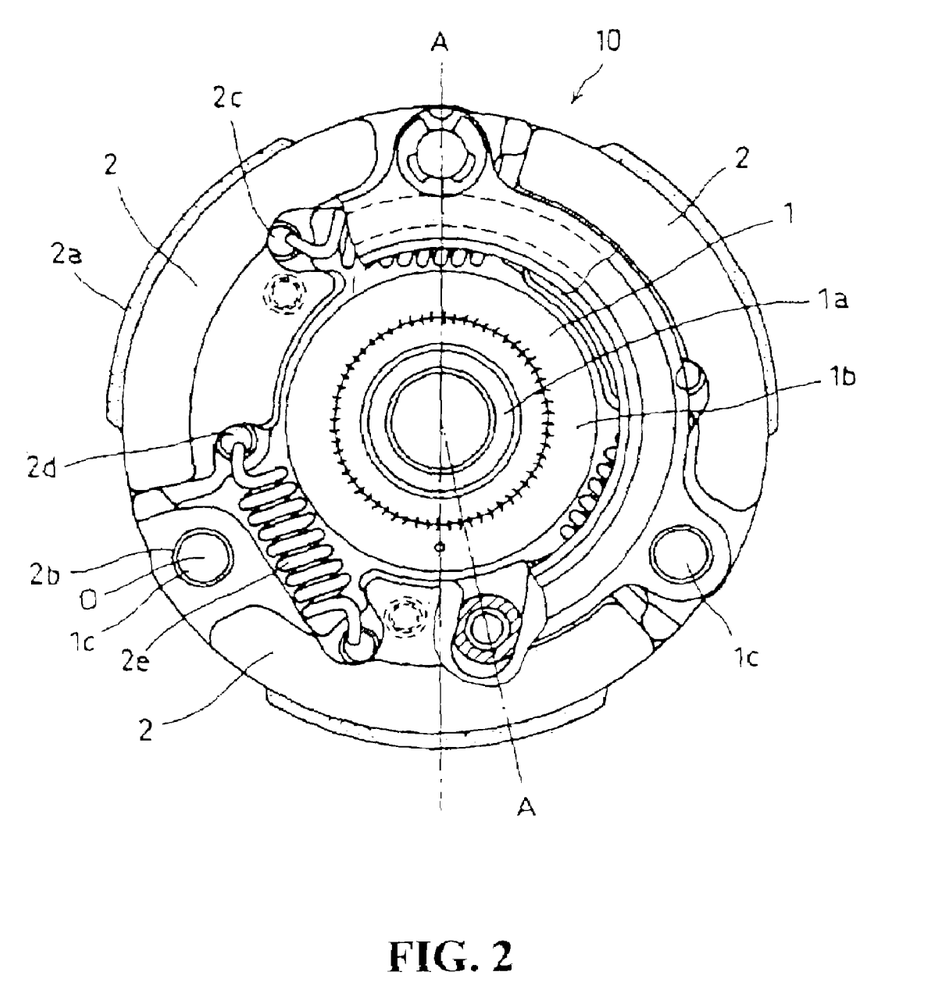
FIG. 2 shows the structure of an essential part of the centrifugal clutch according to the present invention.
Figure 3:
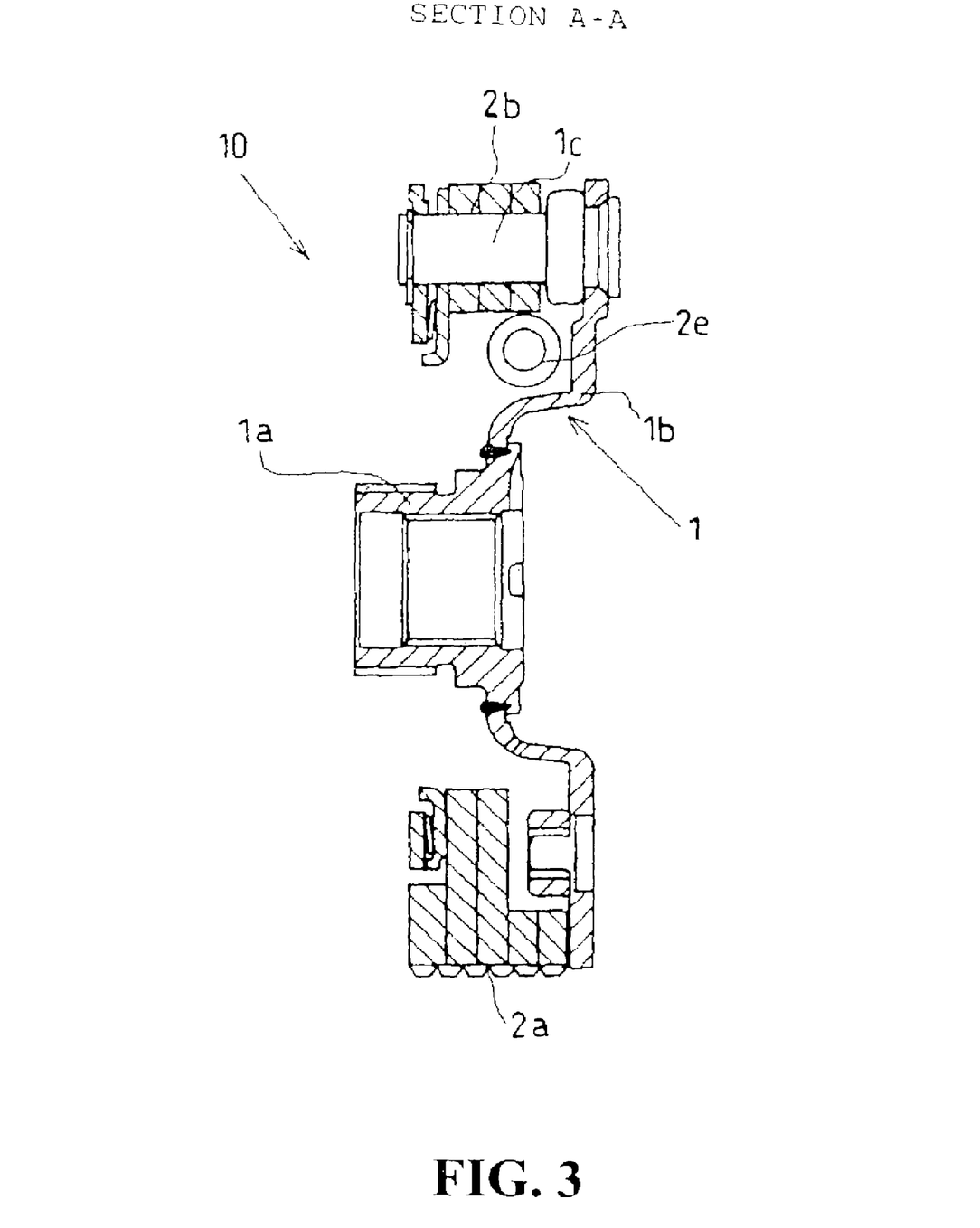
FIG. 3 is a sectional view taken along line A—A of FIG. 2, showing the structure of an essential part of the centrifugal clutch according to the present invention.

As is clear from FIGS. 2 and 3, the centrifugal clutch 10 includes a plate structure portion 1 comprised of a boss portion 1a having a hole for attachment to the crankshaft 11 in a central portion thereof, and a plate form member 1b extending in the radial direction from the boss portion 1a. Three pin portions 1c are provided at even positions on the circumference in the vicinity of an outer circumferential portion of the plate form member 1b of the plate structure portion 1, and the three pin portions 1c are engaged respectively with holes 1b opened in end portions on one side of the individual clutch weights 2, whereby the clutch weights 2 can individually be inclined with the pin portion 1c as a fulcrum of inclination O.

As is clear from the foregoing and FIG. 2, the centrifugal clutch 10 includes the three clutch weights 2.

The clutch weights 2 are mutually connected by spring members 2e disposed bridgingly between spring openings 2c and 2d thereof, and each of the clutch weights 2 is provided with the lining portion 2a at an outer circumferential portion thereof. The lining portion 2a is pressed against the inner circumferential portion 2a of the clutch outer 3 (see FIG. 1), by an operation attendant on the inclination against the spring member 2e of each clutch weight 2 with the pin portion 1c as the fulcrum of inclination O at the time of operation of the clutch 10.

The condition shown in FIG. 2 is a non-operative condition of the centrifugal clutch 10 where the crankshaft 1 is not driven, showing the condition where the spring members 2e are in a contracted state and the individual clutch weights 2 are maintained in mutually non-operative positions.

The individual clutch weights 2 of the centrifugal clutch 10 has the same structure. Specifically, each clutch weight 2 has a structure in which a plurality of sheets of weight component members 2A formed by baking a sintered metallic powder are stacked or a plurality of sheets of weight component members 2B formed by stamping a steel sheet such as an SP material in a predetermined shape are stacked, and are united by fixing the stack portion by an appropriate means such as welding. As far as the structure is concerned, the clutch weight 2 is not especially different from the clutch weight 02 that is well known in the background art.

Figure 4:
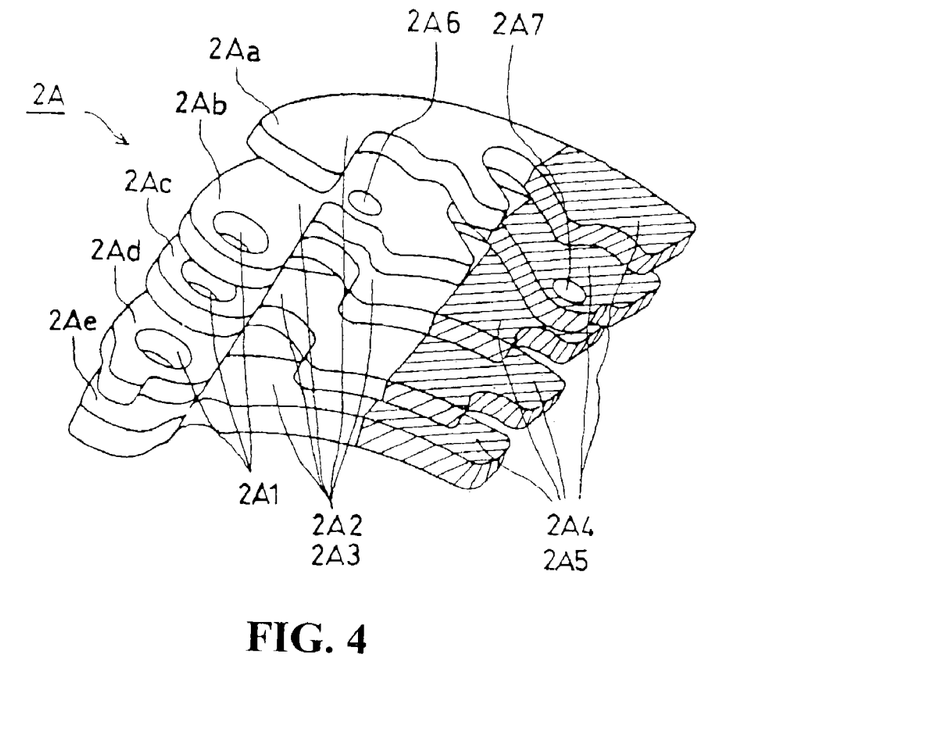
FIG. 4 shows component members of a clutch weight constituting an essential structural part in an embodiment of the present invention.
Figure 5:
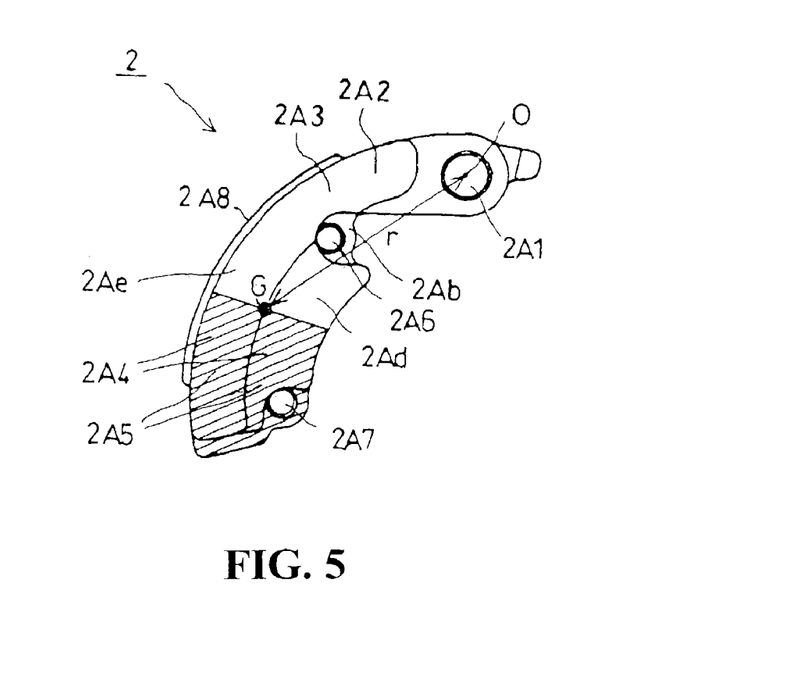
FIG. 5 is a side view of the clutch weight, showing an essential structural part of the clutch weight according to the present invention.

The clutch weight 2 in Embodiment 1 of the present invention is an improvement in the conventional clutch weight 02 in which the weight component members 02A formed by baking the sintered metallic powder are used as assembly elements. FIGS. 4 and 5 show weight component members 2A which are the assembly elements of the clutch weight 2 characteristic of the present invention.

The weight component members 2A consists of a set of five sheets 2Aa to 2Ae. The weight component members 2Aa to 2Ae differ in shape, of which three sheets 2Ab to 2Ad are each provided with a fitting hole 2A1 for fitting with the pin portion 1c constituting the fulcrum of inclination O, while one weight component member 2Ab thereof is provided with spring openings 2A6 and 2A7 for the spring member 2e. These weight component members 2Aa to 2Ae are arranged in the order shown in FIG. 4, and are united by stacking them and fixing predetermined portions thereof by an appropriate means such as welding, to assemble the clutch weight 2. FIG. 5 shows a side view of the clutch weight 2 thus assembled.

As shown in FIGS. 4 and 5, the clutch weight component members 2Aa to 2Ae are each composed of formed portions formed by baking two kinds of sintered metallic powders differing from each other in specific gravity. Specifically, a portion near the fulcrum of inclination O of each of the weight component members 2Aa to 2Ae, i.e., a portion 2A2 near the fitting hole 2A1 in each of the component members 2Ab to 2Ad having the fitting hole 2A1 constituting the fulcrum of inclination O, of the weight component members 2A, and a portion 2A2 near the fulcrum of inclination O at the time of assembly in each of the component members 2Aa and 2Ae not having the fitting hole 2A1, is constituted as the formed portion 2A3 formed by baking a sintered metallic powder having a smaller specific gravity.

On the other hand, a portion away from the fulcrum of inclination O, i.e., a portion 2A4 away from the fitting hole 2A1 in each of the component members 2Ab to 2Ad having the fitting hole 2A1 constituting the fulcrum of inclination, of the weight component members 2A, and a portion 2A4 away from the fulcrum of inclination O at the time of assembly in the component members 2Aa and 2Ae not having the fitting hole 2A1, is constituted as a formed portion 2A5 formed by baking a sintered metallic powder having a larger specific gravity.

The formed region division between the formed portion 2A2, 2A3 formed by baking the sintered metallic powder having a smaller specific gravity and the formed portion 2A4, 2A5 formed by baking the sintered metallic powder having a larger specific gravity, of each of the weight component members 2Aa to 2Ae, is not limited to that shown in FIG. 4. The formed region division is appropriately set in consideration of the difference in specific gravity between the sintered metallic powders used and the like.

Incidentally, symbol 2A8 denotes a lining portion.

As the sintered metallic powder having a larger specific gravity, a sintered metallic powder of Ni, W, Mo, Cu or the like is used; as the sintered metallic powder having a smaller specific gravity, a sintered metallic powder of Fe, Cr, V, Zn, Mn or the like is used.

Of the clutch weight 2 assembled by stacking a plurality of sheets (five sheets) of the weight component members 2Aa to 2Ae, the portion away from the fulcrum of inclination O is constituted as the formed portion 2A4, 2A5 formed by baking the sintered metallic powder having a larger specific gravity. Therefore, as shown in FIG. 5, the position of center of gravity G is located at a position in the direction away from the fulcrum of inclination O of the clutch weight 2, and the distance r from the fulcrum of inclination O to the position of the center of gravity G is greater than that in the conventional clutch weight 02 formed by baking a sintered metallic powder of a single material.

The distance r from the fulcrum of inclination O in the clutch weight 2 can be appropriately determined by the selection of the kinds of the sintered metallic powders used for forming the weight component members 2A and by selective setting of the formed region division between the formed portion 2A2, 2A3 formed through baking of the sintered metallic powder having a smaller specific gravity and the formed portion 2A4, 2A5 formed through baking the sintered metallic powder having a larger specific gravity or the proportions of the formed regions. Therefore, it is possible to set the position of the center of gravity G at an appropriate desired position, without changing the substantial outer shape of the clutch weight 2.

Since Embodiment 1 shown in FIGS. 4 and 5 is constituted as described above, even when a modification in regard of an increase in engine output or an increase in engine exhaust gas quantity is contrived, it is possible to provide a centrifugal clutch for starting of a vehicle which has a clutch capacity suited to the modification. In addition, notwithstanding the increase in the capacity of the centrifugal clutch, the outer shape of the clutch weight 2 is not substantially changed, so that it is possible to prevent the clutch from being enlarged in size. Therefore, the conventional problem of changing the surrounding structure for securing a space based on the increase in the capacity of the centrifugal clutch attendant on a modification for increasing the engine output or the exhaust gas quantity can be dissolved.

Next, another embodiment of the present invention will be described based on FIGS. 6 and 7.

A clutch weight 2 in Embodiment 2 of the present invention is an improvement of the conventional clutch weight 02 assembled by stacking a plurality of sheets of weight component members 02B formed by stamping an appropriate steel sheet or the like in a predetermined shape and uniting them by welding. As shown in FIG. 6, the clutch weight component members 2B constitute a set of five sheets 2Ba to 2Be thereof, in which the component members 2Ba to 2Be are each formed by stamping a steel sheet such as an SP material, the component members 2Ba to 2Be differ in stamping shape, three sheets thereof, i.e., the weight component members 2Bb to 2Bd are each provided with a fitting hole 2B1 for fitting with a pin portion 1c constituting the fulcrum of inclination O, and one sheet thereof, i.e., the weight component member 2Bb is provided further with spring openings 2B6 and 2B7 for a spring member 2e.

Figure 6:
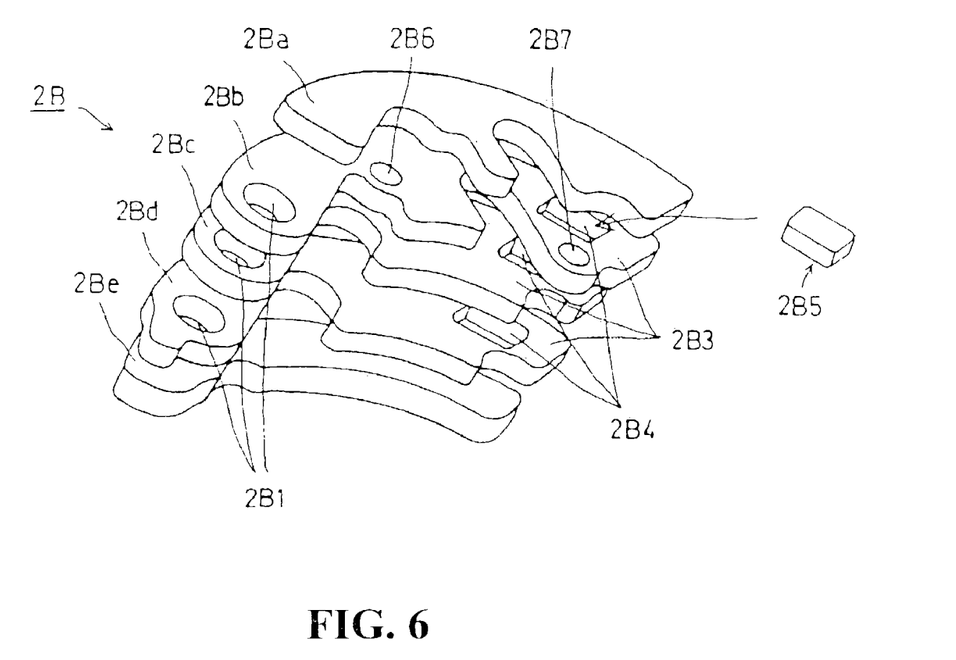
FIG. 6 shows component members of a clutch weight constituting an essential structural part in another embodiment of the present invention.

The weight component members 2Ba to 2Be are stacked together in the order as shown in FIG. 6. Three sheets of weight component members 2Bb to 2Bd disposed on the inner side in the stacking are each provided with a rectangular or tetragonal opening 2B4 on the other end side 2B3 at a position near a tip end portion away from the fitting hole 2B1 for fitting with the pin portion 1c constituting the fulcrum of inclination O.

As shown in FIG. 6, a member 2B5 formed of a metallic material or the like different from a base material of the weight component members 2B is charged or fitted in the opening 2B4. The member 2B5 is formed of a material having a specific gravity larger than that of the SP material or the like used as the base material of the weight component members 2B.

As the member 2B5 thus charged or fitted, for example, a member formed of Pb or the like is selected.

The charging or fitting of the member 2B5 into the opening 2B4 is carried out by beating or pressing the member 2B5, which is formed of Pb or the like in a rectangular or tetragonal shape roughly the same as the shape of the opening 2B4, into the opening 2B4, or by melting the pb or the like having a comparatively low melting point and causing the molten material to flow into the opening 2B4.

Where other metallic member is used as the member 2B5, the metallic member may be fitted into the opening 2B4 and may be attached in position by welding or the like.

In any way, since the clutch weight 2 is used in the condition of being moved vigorously in high-speed rotation, the member 2B5 must be charged or fitted in the opening 2B4 of the weight component members 2B securely and firmly.

After the operation of charging or fitting the member 2B5 into the opening 2B4 of the weight component members 2B, a finishing operation by use of a grinder or a file for removing projection or burs from the surface thereof is appropriately conducted so that no trouble is generated in stacking the weight component members 2Ba to 2Be at the time of assembly thereof.

After the operation of charging or fitting the member 2B5 into the opening 2B4 of the weight component members 2B, the weight component members 2Ba to 2Be are stacked together in a predetermined order shown in FIG. 6 in such a manner that the weight component members 2Bb to 2Bd with the member 2B5 charged or fitted therein are disposed on the inside, and a predetermined portion of the stack is united by appropriate welding, whereby the clutch weight 2 is assembled.

Incidentally, the shape and size of the opening 2B4, the number of the openings 2B4 and the like are selectively set, as required.

Figure 7:
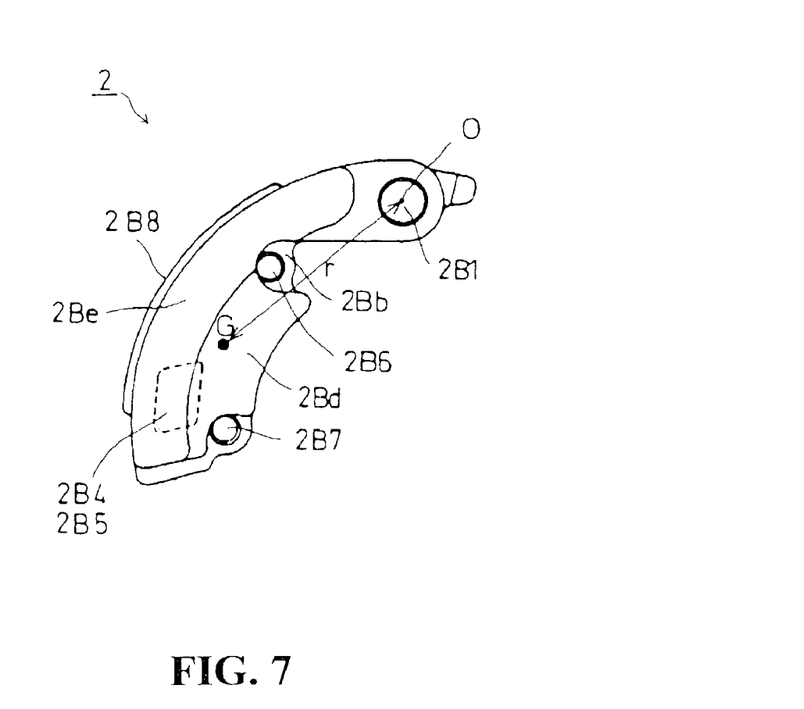
FIG. 7 is a side view of the clutch weight, showing an essential structural part of the clutch weight in the embodiment of the present invention.

Since Embodiment 2 shown in FIGS. 6 and 7 is constituted as described above, of the clutch weight 2 assembled by stacking the weight component members 2Ba to 2Be together and uniting them, the distance r from the fulcrum of inclination O to the center of gravity G thereof can be set to be larger than that of the conventional clutch weight 02 composed of a single material. Therefore, a starting clutch 10 having a clutch capacity suited to the modification as to an increase in engine output or an increase in engine exhaust gas quantity can be obtained by a simple structural modification. In addition, since it is unnecessary to substantially change the outer shape of the clutch weight 2 notwithstanding the increase in the clutch capacity, it is unnecessary to enlarge the clutch 10 in size and the space problem based on the increase in the capacity of the clutch 10 is dissolved.

Various embodiments can be considered in place of the above-described embodiments.

While the numbers of sheets of the clutch weight component members 2A and 2B are respectively five in Embodiments 1 and 2, the numbers are not limited to five, and the number of sheets of the weight component members 2A, 2B may be selectively set, as required.

While all of the plurality of sheets of weight component members 2Aa to 2Ae for forming the clutch weight 2 are composed of the formed portion 2A2, 2A3 formed by baking the sintered metallic powder having a smaller specific gravity and the formed portion 2A4, 2A5 formed by baking the sintered metallic powder having a larger specific gravity in Embodiment 1, all the weight component members 2Aa to 2Ae may not necessarily be formed in this manner; the number of sheets to be formed in this manner may be appropriately selected, and an appropriate number of sheets of weight component members 1A composed only of a formed portion formed by baking a single sintered metallic powder may be included in the weight component members.

While several kinds of materials have been mentioned as examples of the kinds of the sintered metallic powders in Embodiment 1, the mentioned kinds are not limitative; appropriate kinds of sintered metallic powders may be selectively used, within such a range as to enable the desired effects of the present invention.

While the clutch weight component members 2B have been formed of a steel plate such as an SP material and a metallic material such as Pb has been used as the member 2B5 to be charged or fitted in the opening 2B4 of the weight component members 2B in Embodiment 2, use of a comparatively lightweight metallic sheets of Al, an Al alloy or the like in place of the steel sheet such as an SP material used as the weight component members 2B may be considered, taking into account the harmfulness of Pb, Co, Cd or the like. In this case, it is possible to use a metallic member of Fe or the like as the member 2B5 to be charged or fitted in the opening 2B4.

While a metallic member has been used as the member 2B5 to be charged or fitted in the opening 2B4 in Embodiment 2, the member 2B5 to be charged or fitted is not limited to a metallic material, and a nonmetallic material may be selectively used, as required.

While the weight component members 2B being the object of setting of the member 2B5 to be charged or fitted have been described as the weight component members 2Bb to 2Bb which are all of the component members disposed on the inside in stacking the weight component members at the time of assembly thereof in Embodiment 2, this arrangement is not limitative. Namely, it suffices that the weight component members 2B judged to be necessary are selected as the object of setting, a single sheet of weight component member 2B may be selected, and the weight component members 2Ba and 2Be disposed on the outside at the time of assembly may be selected as the object of setting.

While the opening 2B4 for charging or fitting the member 2B5 therein has been described as rectangular or tetragonal in shape in Embodiment 2, the shape of the opening 2B4 may be appropriately selected to be circle, ellipse, triangle, elongate slot or the like, and the opening may be a through-hole and may be a blind hole.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A centrifugal clutch for transmitting power of an engine by connecting a driving side and a driven side to each other, comprising:
    a clutch weight which inclines under a centrifugal force, the clutch weight having a plurality of weight component members which are stacked and fixed to each other,
    wherein each of said weight component members has a first part and a second part, the first parts having smaller specific gravities than the second parts, whereby a center of gravity of said clutch weight is set to a predetermined position,
    wherein the clutch weight includes five weight component members, three of the weight component members having a fitting hole for accommodating a pin serving as a fulcrum of inclination, and two of the weight component members not having a fitting hole.

2. The centrifugal clutch according to claim 1, wherein the predetermined position of said center of gravity of said clutch weight is set by forming the first parts of the weight component members by baking a sintered metallic powder with said smaller specific gravity, and forming the second parts of the weight component members by baking a sintered metallic powder with a larger specific gravity, and said second parts formed by baking said sintered metallic powder with the larger specific gravity is set on a side of a tip portion of said clutch weight away from a fulcrum of inclination of said clutch weight.

3. The centrifugal clutch according to claim 1, wherein each of said plurality of weight component members has a different shape.

4. The centrifugal clutch according to claim 1, wherein the fitting holes are provided on the first parts of the three weight component members having the fitting holes.

5. The centrifugal clutch according to claim 1, wherein the three weight component members having the fitting holes are stacked together and sandwiched between the two of the weight component members not having the fitting holes.

6. The centrifugal clutch according to claim 1, wherein one of the three weight component members having the fitting holes is provided with two spring openings.

7. The centrifugal clutch according to claim 6, wherein one of the spring openings is provided on the first part of the one of the three weight component members having the fitting holes.

8. The centrifugal clutch according to claim 6, wherein a second of the spring openings is provided on the second part of the one of the three weight component members having the fitting holes.

9. A centrifugal clutch for transmitting power by connecting a driving side and a driven side to each other through inclination, comprising:
    a clutch weight which inclines under a centrifugal force, wherein said clutch weight is formed of members each of which has one portion with a smaller specific gravity than another portion, whereby a position of a center of gravity of said clutch weight is set,
    wherein the clutch weight includes five members, three of the members having a fitting hole for accommodating a pin serving as the fulcrum of inclination, and two of the members not having a fitting hole.

10. The centrifugal clutch according to claim 9, wherein each of said members has a different shape.

11. The centrifugal clutch according to claim 9, wherein the fitting holes are provided on the portions having the smaller specific gravities.

12. The centrifugal clutch according to claim 9, wherein the three members having the fitting holes are stacked together and sandwiched between the two of the members not having the fitting holes.

13. The centrifugal clutch according to claim 9, wherein at least some of the three members having the fitting holes are provided with the first spring opening and a second spring opening, the second spring opening being provided away from the first spring opening.

14. The centrifugal clutch according to claim 13, wherein the second spring opening is provided adjacent to a fulcrum of inclination.

15. The centrifugal clutch according to claim 13, wherein the first spring opening away from a fulcrum of inclination.

16. The centrifugal clutch according to claim 9,
    wherein said setting of said center of gravity of said clutch weight is achieved by providing at least some of the members with a material having a specific gravity larger than the specific gravity of a base material of said clutch weight, the material being selectively fitted into a tetra-opening provided on the side of a tip portion of said at least one of the members away from a fulcrum for said inclination of said clutch weight,
    wherein a first spring opening is provided adjacent to the tetra-opening on the tip portion of said at least one of the members.

17. A centrifugal clutch for transmitting power of an engine by connecting a driving side and a driven side to each other, comprising:
    a clutch weight which inclines under a centrifugal force, the clutch weight having a plurality of weight component members which are stacked and fixed to each other,
    wherein each of said weight component members has a first part and a second part each being formed of a sintered metallic powder, the first parts having smaller specific gravities than the second parts, whereby a center of gravity of said clutch weight is set to a predetermined position,
    wherein the clutch weight includes five weight component members, three of the weight component members having a fitting hole for accommodating a pin serving as a fulcrum of inclination, and two of the weight component members not having a fitting hole, and
    wherein at least one spring hole is provided on either the second or the fourth weight component member of the stack of five weight component members.

* * * * *